US012632024B2

(12) United States Patent　　　(10) Patent No.:　US 12,632,024 B2
Lueken et al.　　　　　　　　　　　(45) Date of Patent:　May 19, 2026

(54) SYSTEMS AND METHODS FOR MANAGING CAPACITY OF AN ENERGY STORAGE SYSTEM

(71) Applicant: FLUENCE ENERGY, LLC, Arlington, VA (US)

(72) Inventors: Colleen Lueken, Arlington, VA (US); Alejandra Jolodosky, Washington, DC (US); Abhishek Malik, Pittsburgh, PA (US)

(73) Assignee: FLUENCE ENERGY, LLC, Arlington, VA (US)

( * ) Notice: Subject to any disclaimer, the term of this patent is extended or adjusted under 35 U.S.C. 154(b) by 707 days.

(21) Appl. No.: 17/986,348

(22) Filed: Nov. 14, 2022

(65) Prior Publication Data

US 2024/0160171 A1　　May 16, 2024

(51) Int. Cl.
　　G05B 19/042　　　　(2006.01)
(52) U.S. Cl.
　　CPC ....　G05B 19/042 (2013.01); G05B 2219/2639 (2013.01)
(58) Field of Classification Search
　　CPC .......... G05B 19/042; G05B 2219/2639; G06Q 10/063; G06Q 50/06; H02J 13/00002; H02J 7/0048
　　See application file for complete search history.

(56) References Cited

U.S. PATENT DOCUMENTS

| | | | | |
|---|---|---|---|---|
| 6,532,425 | B1 * | 3/2003 | Boost ................. | G01R 31/3648 |
| | | | | 320/136 |
| 2015/0048673 | A1 * | 2/2015 | Chintala ................. | B60L 58/15 |
| | | | | 307/9.1 |
| 2016/0370433 | A1 * | 12/2016 | Chazal ................. | G01R 31/396 |
| 2021/0072322 | A1 * | 3/2021 | Makam ................... | B60L 58/22 |
| 2022/0239122 | A1 | 7/2022 | Baumann | |

OTHER PUBLICATIONS

Plett "Recursive approximate weighted total least squares estimation of battery cell total capacity" from "Journal of Power Sources 196 (2011) 2319-2331" (Year: 2011).*

* cited by examiner

*Primary Examiner* — Yuhui R Pan
(74) *Attorney, Agent, or Firm* — Buchanan Ingersoll & Rooney

(57)　　　　　ABSTRACT

Systems and methods are disclosed for managing capacity of an energy storage system. In one implementation, a system includes at least one node configured to generate energy data; at least one processor; and a memory storing instructions that, when executed by the at least one processor, cause the at least one processor to: extract, using a data storage module, the energy data from the at least one node; ingest, using a data aggregation module, first data from the data storage module; estimate, using a capacity estimation module, a capacity of the at least one node by: importing second data from the data aggregation module; determining at least one input and at least one output configured to modulate a capacity determination; and determining the capacity of the at least one node based on the calculated at least one input and at least one output; and implement a corrective action for the energy storage system based on the estimated capacity.

22 Claims, 4 Drawing Sheets

300

310 Generating energy data.

312 Extracting the energy data from the at least one node.

314 Ingesting first data from the data storage module.

316 Estimating a capacity of the at least one node.

318 Implementing corrective action based on the estimated capacity.

300

316

320

Importing second data from the data aggregation module.

322

Determining at least one input configured to modulate a capacity determination and at least one output.

324

Determining the capacity of the at least one node based on the calculated at least one input and at least one output.

SYSTEMS AND METHODS FOR MANAGING CAPACITY OF AN ENERGY STORAGE SYSTEM

TECHNICAL FIELD

The present disclosure generally relates to the field of energy storage systems. More specifically, the present disclosure relates to systems, methods, and devices for managing capacity of an energy storage system.

BACKGROUND INFORMATION

Lithium-ion batteries have become one of the dominant energy storage devices for portable electric devices, electric vehicles, supplying power to electrical grid systems, and many other applications. However, battery degradation is an important concern in the use of lithium-ion batteries as their performance decreases over time due to irreversible physical and chemical changes. A state of health of a battery has been used as an indicator of the state of the battery and is usually expressed by the ratio of the relative residual battery with respect to the initial battery capacity. An accurate battery capacity estimation is challenging but critical to the reliable usage of the lithium-ion battery. This is because an accurate capacity estimation allows for an accurate calculation of the maximum energy storage capability.

Some of the disclosed embodiments are directed to providing a new approach for solving the problem of estimating the online capacity of energy storage systems (including batteries) by adjusting or correcting battery configurations.

SUMMARY

Embodiments consistent with the present disclosure provide systems, methods, and devices for providing and supporting energy storage systems, particularly using energy management.

Some disclosed embodiments may include systems, methods and non-transitory computer readable media for managing capacity of an energy storage system. Some of these embodiments may involve generating, via at least one node, energy data; and executing, via at least one processor, instructions stored in a memory to cause the at least one processor to: extract, using a data storage module, the energy data from the at least one node; ingest, using a data aggregation module, first data from the data storage module; estimate, using a capacity estimation module, a capacity of the at least one node by: importing second data from the data aggregation module; determining at least one input configured to modulate a capacity determination and at least one output; and determining the capacity of the at least one node based on the calculated at least one input and at least one output; and implement a corrective action for the energy storage system based on the estimated capacity.

Consistent with other disclosed embodiments, non-transitory computer readable storage media may store program instructions, which are executed by at least one processing device and perform any of the methods described herein.

The foregoing general description and the following detailed description are exemplary and explanatory only and are not restrictive of the scope of the claims.

BRIEF DESCRIPTION OF THE DRAWINGS

The accompanying drawings, which are incorporated in and constitute a part of this disclosure, illustrate various exemplary disclosed embodiments. In the drawings.

DETAILED DESCRIPTION

Figure 1:
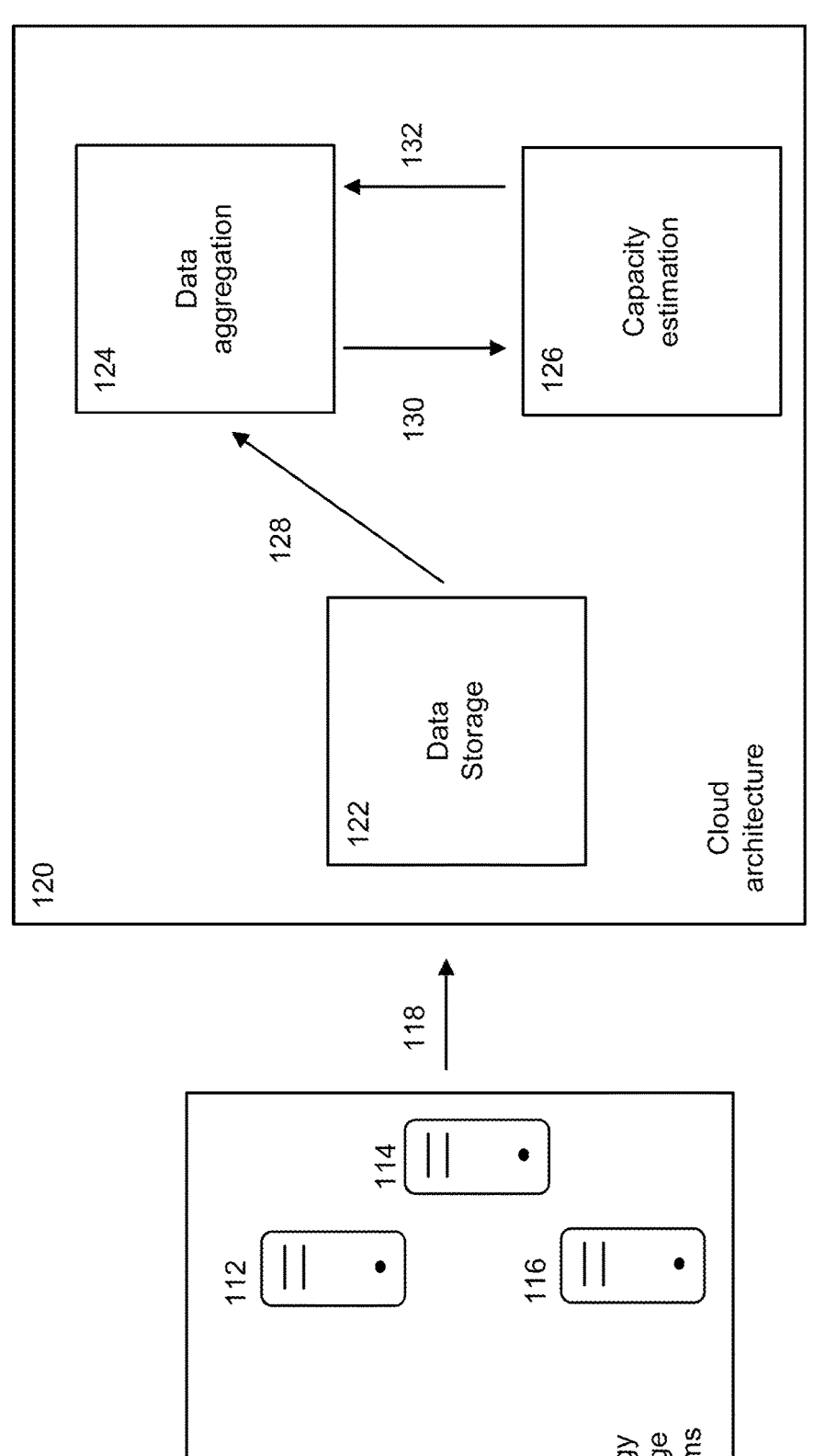
FIG. 1 illustrates an exemplary system for managing capacity of an energy storage system, consistent with some embodiments of the present disclosure.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the specific embodiments and examples, but is inclusive of general principles described herein and illustrated in the figures in addition to the general principles encompassed by the appended claims.

Disclosed embodiments include a system for managing capacity of an energy storage system. An energy storage system may include one or a combination of devices used to capture or store energy, such as electrical energy. Examples of an energy storage system may include a battery cell, an array of battery cells, or an array of modules made up of various combinations of battery cells. A battery may include any source of electric power consisting of one or more electrochemical cells with external connections for powering electrical devices. A battery's capacity may include an amount of electric charge it can deliver at a rated voltage. Capacity may be measured in units such as amp-hour (A.h) or kilo-watt-hour (kW h). Managing capacity of an energy system may include monitoring one or more components of the energy storage system, providing protection to one or more of those components, estimating a capacity or other operational state of the energy storage system, optimizing the performance of the energy storage system, and/or reporting an operational status of the energy storage system to external devices. It may be desirable to manage capacity of an energy storage system to rearrange battery structures based on the estimated capacity of each battery of an energy storage system. For example, batteries with lower capacities may be replaced with batteries with higher capacities. As another example, a battery with a lower capacity may be configured to be used before or after another battery with a higher capacity depending on the specific needs of the energy storage system.

Disclosed embodiments include at least one node configured to generate energy data. In one exemplary embodiment, at least one node may include at least one cell of a battery. It is contemplated, however, that the cell of a battery may include other components (e.g. electrodes and an electrolyte, or any other type of energy storage device). A module may include multiple nodes connected in series and/or in parallel, and may be encased in a mechanical structure. A core may include a larger structure that is assembled by connecting multiple modules together in series or parallel. Thus, at least one node may refer to one or more of an individual cell, a plurality of cells, a module, a core, or any combination thereof. As an example, a node may be a battery cell, including a lithium ion battery that receives or delivers electric energy by charging and discharging, respectively. In one exemplary embodiment, the battery cell may be made by inserting a cathode, anode, separator, and electrolyte into a rectangular aluminum case. As another example, a node may include a battery assembly inserted into a frame by combining a certain number of cells to protect the cells from external shocks, heat, or vibration. As yet another example, a node may include a core installed into a device, such as an electric vehicle, composed of modules and various control or protection systems, such as a system for managing battery capacity, as described herein, or a cooling system. In this example, the core may include eight modules, with each module including twelve cells. In some embodiments, the at least one node includes one of: a container, rack, or battery cell. A container may include any structure configured to house a battery. As an example, a container may be a prismatic case housing a battery, although other shapes and configurations are also contemplated. A rack may include a structure for holding many individual batteries such that the batteries may be electrically-coupled to provide a power source for electronic systems.

Energy data may include any data related to energy generation or storage generated by the at least one node, including but not limited to temperature, current, voltage, a measure of energy, a state of charge, or any combination thereof. The energy data may be generated by the at least one node either continuously, or at predetermined time intervals. For example, a battery cell may generate voltage data every five minutes. As another example, a module may generate current data in response to a user input. As yet another example, a core may generate temperature data in response to a capacity estimate exceeding a certain predetermined threshold.

In some embodiments, the energy data includes at least one of a state of charge or a current value. A state of charge may refer to a ratio of an available capacity and a maximum possible charge that can be stored in a battery. As such, state of charge may be indicative of capacity, and generating energy data including state of charge may be desirable to improve capacity estimation. A current value may include a single current value, a series of current values, or any value dependent on a single or a plurality of current values, such as a sum of current values or an average of current values. A current value of a battery may be relevant to a capacity determination because the sum of currents may be equal to a starting capacity in certain conditions, such as when a state of charge is at a full discharge value of 1.

Disclosed embodiments include at least one processor. Consistent with disclosed embodiments, "at least one processor" may constitute any physical device or group of devices having electric circuitry that performs a logic operation on an input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. In some embodiments, the at least one processor may include more than one processor. Each processor may have a similar construction or the processors may be of differing constructions that are electrically connected or disconnected from each other. For example, the processors may be separate circuits or integrated in a single circuit. When more than one processor is used, the processors may be configured to operate independently or collaboratively, and may be co-located or located remotely from each other. The processors may be coupled electrically, magnetically, optically, acoustically, mechanically or by other means that permit them to interact.

Disclosed embodiments include a memory storing instructions that, when executed by the at least one processor, cause the at least one processor to perform certain functions. The instructions executed by at least one processor may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions.

Disclosed embodiments include causing the processor to extract, using a data storage module, the energy data from the at least one node. A data storage module may include hardware, software, firmware, or a combination thereof. A hardware module may be coupled to another module by mechanical, electrical, optical, electromagnetic or any physical connections. A software module may be coupled to another module by a function, procedure, method, subprogram, or subroutine call, a jump, a link, a parameter, variable, and argument passing, a function return, and the like. A software module may be coupled to another module to receive variables, parameters, arguments, pointers, etc. and/or to generate or pass results, updated variables, pointers, and the like. A firmware module may be coupled to another module by any combination of hardware and software coupling methods above. A hardware, software, or firmware module may be coupled to any one of another hardware, software, or firmware module. A module may also be a software driver or interface to interact with an operating system running on a platform. A module may also be a hardware driver to configure, set up, initialize, send and receive data to and from a hardware device. A system as described herein may include any combination of hardware, software, and firmware modules.

A data storage module may include any hardware, software, or combination thereof configured to extract and store data from any source, such as an external data source, either by wired or wireless means. Extracting the energy data from the at least one node may include any act or process of retrieving data from one or more data sources for further data processing or data storage. Data extraction makes it possible to consolidate, process, and refine data so that it can be stored in a centralized location in order to be transformed. These locations may be on-site, cloud-based, or a hybrid of the two. Extracting the energy data from the at least one node may involve receiving or taking energy data from the at least one node, then transforming and loading that energy data. During the transformation phase, data may be sorted, organized, and cleansed. Data may be sorted, for example, by selecting a specific subset of data. Data may be organized, for example, by arranging one or more subsets of data. For example, duplicate entries may be deleted, missing values removed or enriched, and audits may be performed to produce data that is reliable, consistent, and usable. During the loading phase, the transformed data may be delivered to a target location for storage and analysis. As an example, a data storage software module in a computer may cause the computer to request voltage data from a battery cell. In response to the request, the battery cell may transmit voltage data over a wireless link, such as a Bluetooth™ or Wi-Fi connection, to the computer for storage and analysis. As another example, the data storage module may be a software module hosted on a Cloud-based server, and the voltage data may be wirelessly transmitted to a Cloud-based storage location during the extraction. In one example, extracting the energy data may include running a script on a S3 Standard Cloud-based storage to initiate script-based extraction of the energy data from the at least one node. It may be desirable to extract, using a data storage module such as a S3 standard, the energy data from the at least one node to improve data security, data availability, data migration, scalability, and durability (i.e., reduced likelihood of data loss), which may improve the accuracy of capacity estimation and management. This in turn may lead to improved battery function.

Disclosed embodiments include causing the processor to ingest, using a data aggregation module, first data from the data storage module. A data aggregation module may include any hardware, software, or combination thereof configured to ingest data from any source, either by wired or wireless means. First data may include any data that may be directly or indirectly related to the energy data, for example, timeseries information that may include a node's temperature characteristics (e.g., maximum cell temperature, average cell temperature, or variation in cell temperature, standard deviation in cell temperature), power, voltage, current, state of charge, and state of health. Ingesting first data from the data storage module may involve any process of obtaining and importing first data for immediate use or storage in a database, which may be physical or Cloud-based. Ingesting first data from the data storage module may involve real-time data ingestion, which is the process of collecting and transferring data from source systems, such as the data source module, in real time using solutions such as change data capture (CDC). CDC constantly monitors transaction or redo logs and moves changed data without interfering with the database workload. Transaction logs may refer, for example, to a database source of data changes for CDC reference. Redo logs may refer, for example, to a type of database source for CDC for asynchronous modes of change data capture. Real-time ingestion is essential for time-sensitive use cases, battery capacity monitoring, which requires rapid reactions to new information. Ingesting first data from the data storage module may also involve batch-based data ingestion, which is the process of collecting and transferring data in batches according to scheduled intervals. The ingestion layer may collect data based on simple schedules, trigger events, or any other logical ordering. Ingesting first data from the data storage module may also involve lambda architecture, which is a data ingestion setup that includes both real-time and batch methods. The setup consists of batch, serving, and speed layers. The first two layers index data in batches, while the speed layer instantaneously indexes data that has yet to be picked up by slower batch and serving layers. This ongoing hand-off between different layers ensures that data is available for querying with low latency. As an example, ingesting first data from the data storage module may involve using a serverless data aggregation module such as Snowpipe to load voltage timeseries data as soon as voltage, current, and temperature data are available in a S3 standard. It may be desirable to ingest, using a data aggregation module such as Snowpipe, first data from the data storage module to improve data availability and reduce data complexity. Data ingestion may help systems gather data stored across various sources and move it to a unified environment for immediate access and analysis, which may improve processor speed and efficiency. Data ingestion may also transform various types of data into predefined formats and then deliver it to a data aggregation module. Data ingestion in this manner may improve processor speed and efficiency by requiring less parsing of data.

Disclosed embodiments include causing the processor to estimate, using a capacity estimation module, a capacity of the at least one node. A capacity estimation module may include any hardware, software, or combination thereof configured to appraise, assess, classify, consider, determine, evaluate, examine, predict, or compute a capacity or at least one value or parameter (e.g., time) associated with a capacity of the at least one node. Estimating, using a capacity estimation module, a capacity of the at least one node may include running a capacity estimation script on a Cloud-based machine learning platform such as Amazon Sage-Maker to output a capacity estimate for a given cell at a given time point. It may be desirable to estimate, using a capacity estimation module such as Amazon SageMaker, a capacity of the at least one node to reduce data labeling costs and improve processing speed through more efficient usage of Graphic Processing Units.

In some embodiments, the capacity estimation includes a rainflow cycle calculation to determine at least one partial cycle for use in the capacity estimation, and wherein the at least one partial cycle includes a partial discharge and recharge of the node. A rainflow cycle calculation may include any process of successively extracting the smaller interruption cycles from a sequence (of, for example, charging or discharging battery capacity) that will weaken and eventually fail. It may be desirable to use a rainflow cycle calculation to determine at least one partial cycle for use in the capacity estimation because rainflow cycle calculation is highly accurate, which may improve battery capacity estimation and management, and may also improve battery function. The determined at least one partial cycle may include the most useful partial cycles for capacity estimation. In practical use, a battery often cannot carry out a full charging or discharging cycle. Therefore, battery capacity estimation and management accuracy is improved by simulating practical conditions, such as a partial cycle.

In some embodiments, the capacity estimation module is configured to simultaneously estimate capacity values for a plurality of nodes in the energy storage system. For example, the energy storage system may include four batteries. In this example, the capacity estimation module may simultaneously estimate capacity values for all four batteries. In some embodiments, the capacity estimation module is configured to simultaneously estimate capacity values for a plurality of nodes in a plurality of energy storage systems. For example, the energy storage system may include two cores in a first module and two cores in a second module. In this example, the capacity estimation module may simultaneously estimate capacity values for all four cores, even though the cores are in different modules.

Disclosed embodiments include causing the processor to estimate the capacity of the at least one node by importing second data from the data aggregation module. Second data may include any data that may be directly or indirectly related to the first data. Such data may be presented as rows and columns that define relationships between configurations of the energy storage system (e.g., array, core, module, node) and information that includes a node's temperature characteristics (e.g., maximum cell temperature and average cell temperature), power, voltage, current, state of charge, and start of health. Importing second data from the data aggregation module may include using Amazon SageMaker to run a script to pull tables of cells and current from Snowflake. It may be desirable to estimate the capacity of the at least one node by importing second data from the data aggregation module to improve processor speed and efficiency by avoiding an Application Programming Interface to instantly access data.

Disclosed embodiments include causing the processor to estimate the capacity of the at least one node by determining at least one input and at least one output configured to modulate a capacity determination. Determining at least one input and at least one output to modulate a capacity determination may include applying an approximated weighted total least squares method (AVVTLS method) to improve the accuracy of capacity estimation and management, which in turn improves battery function. Determining at least one input and at least one output to modulate a capacity determination, such as by applying an AVVTLS method, may be desirable to extract meaningful information from small data sets and to accurately estimate capacity from data points of varying quality, such as those seen in energy data from nodes of an energy storage system. This in turn improves battery capacity estimation and management in order to improve battery function.

In some embodiments, the at least one input includes one or more of an error parameter associated with a current sensor of the at least one node or a state of charge error parameter associated with the at least one node. In a capacity estimation system, if a current sensor of the at least one node fails or malfunctions, the capacity estimation may be confronted with large error. By taking advantage of at least one input in the form of an error parameter associated with a current sensor of the at least one node, the influence caused by the current sensor's malfunction may be eliminated and compensated. A state of charge (SoC) may refer to a ratio of the available capacity and the maximum possible charge that can be stored in a battery. Measuring SoC by voltage is simple, but it can be inaccurate because cell materials and temperature affect the voltage. A common error of the voltage-based SoC occurs when disturbing a battery with a charge or discharge. The resulting agitation distorts the voltage and it no longer represents a correct SoC reference for a capacity estimation. By taking advantage of at least one input in the form of an error parameter associated with a state of charge error parameter associated with the at least one node, the influence caused by the voltage distortion may be eliminated and compensated. Certain non-limiting examples of an error parameter associated with a current sensor of the at least one node may include a percentage of current, a standard deviation of current, or an estimated error in measuring current. Certain non-limiting examples of a state of charge error parameter associated with the at least one node may include a percentage of state of charge, a standard deviation of state of charge, or an estimated error in measuring state of charge.

In some embodiments, the at least one input includes a starting capacity parameter associated with the at least one node. A starting capacity parameter may include, for example, a maximum current that a battery at full load can develop continuously at a particular temperature (e.g., 0° C.) for a predetermined interval of time (e.g., 30 seconds), with a predetermined voltage (e.g., 1.2 volts) in each of its cells. It may be desirable to use a starting capacity parameter associated with the at least one node in the capacity determination because typically the starting values of the recursive solution in AWTLS are much larger than the subsequent values. This indicates that the starting values of the recursive solution may contaminate the result of the recursive method from the beginning, such that. Thus, starting the determination at high values including a capacity that is around the actual starting capacity value (e.g., 475 units), the capacities may decrease over time and stabilize at the end. At lower values and when no initial starting capacity is assumed (e.g., 0), the values may slightly increase over time and then stabilize. By taking advantage of at least one input in the form of a starting capacity parameter associated with the at least one node, the influence caused by a high or low starting capacity may be eliminated and/or compensated.

In some embodiments, the at least one input includes a starting capacity variance parameter associated with the starting capacity parameter. A starting capacity variance parameter may include a variance of a starting capacity measurement. In some examples, a starting capacity variance parameter may be included in the determination if a starting capacity is included in the determination. It may be desirable to use a starting capacity variance parameter associated with the at least one node in the capacity determination because a higher starting capacity variance parameter may cause a higher instability in the capacity determination, such as noise. By taking advantage of at least one input in the form of a starting capacity variance parameter associated with the at least one node, the influence caused by this instability may be eliminated and/or compensated.

In some embodiments, the at least one input includes a forgetting factor parameter associated with the at least one node that determines a weight associated with a previous recursive value. The forgetting factor may refer to a memory of an AWTLS method, and may affect convergence and ability of the AWTLS method to track time-varying statistics in an input sequence, and conversely a stability of coefficients used in the method. Recursive values which are determined further in the past may have less weight that those determined more recently using the forgetting factor. The forgetting factor parameter may be a value between 0 and 1. A lower forgetting factor may result in added noise in a capacity determination over time, because while a higher forgetting factor improves accuracy, it conversely increases noise. By taking advantage of at least one input in the form of a forgetting factor parameter associated with the at least one node, the influence caused this noise may be eliminated and compensated.

In some embodiments, the at least one input includes a capacity threshold parameter associated with the at least one node. A capacity threshold parameter may include any parameter used to remove outliers (i.e., fictitious results) from the calculation of capacity. The capacity threshold parameter may be based on a difference between an expected sum of current over a time interval and an actual sum of current over the time interval. If the absolute value of that difference is above a predetermine value or "capacity threshold parameter," the data point for that specific time interval may be excluded from the calculation. It may be desirable to use a capacity threshold parameter to remove outliers to remove any fictitious results caused by the calculation.

In some embodiments, the at least one input includes a scaling factor parameter associated with the state of charge error parameter associated with the at least one node and an error parameter associated with a first current sensor of the at least one node. A scaling factor parameter may include a proportionality constant used in AWTLS recursive calculations. This is relevant because the AWTLS method is an approximated method of the much more complex weighted total least squares (VVTLS) method, which has no closed form solution. Both methods have cost functions, and it is desirable for the AVVTLS cost function to be as close as possible to the VVTLS cost function to improve the accuracy of a capacity estimation. The scaling factor parameter may be used to make the AVVTLS cost function equal to the WTLS cost function to improve this accuracy. Thus, in an AVVTLS calculation, a variance of an original input vector may be equal to a proportionality constant times a variance of a scaled output vector.

Disclosed embodiments include causing the processor to estimate the capacity of the at least one node by determining the capacity of the at least one node based on the calculated at least one input and at least one output. Determining the capacity of the at least one node based on the calculated at least one input and at least one output may include estimating a capacity of the at least one node based on either the values of the calculated at least one input and at least one output or another parameter determined from the calculated at least one input and at least one output. For example, determining the capacity may involve determining an AVVTLS of the capacity estimate at a given time. As another example, determining the capacity may involve determining a standard deviation of a capacity estimate at a given time.

In some embodiments, the capacity determination includes at least one of: a capacity in continuous discharge, capacity in intermittent discharge, discharge current, and battery voltage. A capacity in continuous discharge may include, for example, a capacity when a current is drawn through a battery in a continued, extended, steady, or uninterrupted period. A capacity in intermittent discharge may include, for example, a capacity when a current is drawn through a battery in occasional, periodic, recurrent, alternating, or discontinuous periods. A capacity in continuous discharge determination may be desirable to estimate and manage capacity during a maximum drain of a battery. Determining capacity in continuous discharge, especially in different conditions such as varying temperatures, may be desirable to optimize the performance of a battery. A capacity in intermittent discharge determination may be desirable to assess and manage battery configurations based on the intermittent discharge periods that optimize battery capacity, because battery capacity may be different at different discharge periods. A discharge current may include a current emitted by a battery when the battery is being discharged. Discharge current may be used to normalize battery capacity, which is often very different between batteries, such as by scaling battery capacity up or down based on the discharge current of a specific battery. Battery voltage may include a voltage that a battery is charged to when charged to a certain capacity. As such, the battery voltage may function as another indication of battery capacity.

Table I below shows an exemplary configuration of metrics and methods that may be used to determine a battery capacity, consistent with some embodiments of the present disclosure.

TABLE I

| Metric | Value |
|--------|-------|
| Current sensor error: | 0.5% |
| SOC error: | Based on current sensor error |
| Starting capacity: | 452 units? |
| Starting capacity variance: | 0.01 units? |
| Forgetting factor: | 1 (recursive solution entirely depends on previous |

TABLE I-continued

| Metric | Value |
|--------|-------|
| | values) |
| Time between measurements: | 4 hours |
| x-value cutoff (values at or below this cutoff value will not be used): | 5% (this means any values at or below 5% delta SOC are not used) |
| Method used: | AWTLS |

Disclosed embodiments include causing the processor to implement a corrective action for the energy storage system based on the estimated capacity. Implementing a corrective action for the energy storage system based on the estimated capacity may include performing or prompting the performance of any action associated with the energy storage system based on the estimated capacity. It may be desirable to implement a corrective action for the energy storage system based on the estimated capacity to improve battery functioning. In some examples, implementing a corrective action may include prompting the user to perform a corrective action to modify or adjust a battery configuration based on the estimated capacity. In other examples, implementing a corrective action may include powering on or powering off an energy storage system or a component of an energy storage system based on the estimated capacity.

In some embodiments, implementing the corrective action includes adjusting one or more parameters associated with the at least one node to increase or decrease a capacity of the at least one node. One or more parameters associated with the at least one node may include any of a condition, configuration, environment, variable, or other circumstance associated with the at least one node. Certain non-limiting examples of parameters may include battery temperature, battery configuration (i.e., parallel or series), and the number of batteries in a cell. As one example, implementing the corrective action to increase a capacity of the at least one node may include changing the connection between two batteries from a parallel configuration to a series configuration. As another example, implementing the corrective action to decrease a capacity of the at least one node may include changing battery materials, such as replacing magnesium with cobalt in a lithium-ion battery.

FIG. 1 illustrates an exemplary system 100 for managing capacity of an energy storage system, consistent with some embodiments of the present disclosure. As shown in FIG. 1, system 100 may include energy storage systems 110 including racks 112, 114, and 116. System 100 may also include a cloud architecture 120 with a data storage module 122, data aggregation module 124, and capacity estimation module 126. Data storage module 122 may be configured to extract energy data 118 from one or more of racks 112, 114, and 116. Data aggregation module 124 may be configured to ingest first data 128 from data storage module 122. Capacity estimation module may be configured to import second data 130 from data aggregation module 124. Capacity estimation module may also be configured to provide output 132 to data aggregation module 124, including a capacity estimation.

In some embodiments, the system further comprises a dashboard configured to continuously update at least one output parameter based on the estimated capacity of the at least one node. A dashboard may include any user interface configured to provide any or a combination of visual, auditory, or tactile indications of at least one output parameter based on the estimated capacity. As an example, a dashboard may be a window on a computer screen showing an icon, graphic, text, number, or any other visual indication of the estimated capacity. As another example, a dashboard may include an audio tone that is activated when an estimated capacity exceeds some predetermined threshold.

In some embodiments, the dashboard is configured to present a corresponding capacity output for each of a plurality of nodes of the energy storage system. The system may be configured to determine a capacity estimation for a plurality of nodes of the energy storage system, such as for a plurality of batteries. In such embodiments, the dashboard may present a corresponding capacity output for each of those batteries. As an example, the plurality of batteries may include Battery 1 and Battery 2. The dashboard in this example may include a window on a computer screen that shows the capacity outputs for Battery 1 and Battery 2 side by side. As another example, the dashboard may include buttons associated with capacity outputs for Battery 1 and Battery 2, wherein clicking each button may display a capacity output associated with Battery 1 or Battery 2. Other graphical user interface elements for displaying the capacity outputs for one or more batteries with or without user input are also contemplated. For example, the capacity may be displayed in the form of a line graph, bar graph, pie chart, contour graph, or in any other graphical manner capable of displaying the capacity values for one or more batteries.

In some embodiments, the dashboard includes an interactive zone configured to accept a user input, and the at least one processor is configured to: receive the user input representative of a selection of a first node from a plurality of nodes of the energy storage system; and estimate, using the capacity estimation module, the capacity of the selected first node. An interactive zone may include any region, area, or shape in the dashboard configured to receive a user input. A user input may include a click, tap, double tap, swipe, finger pinch, selection of a graphical user interface element, or any interaction with any element of a device usable with the disclosed embodiments in order to interact with the interactive zone. As an example, the user input may involve a user clicking on a button associated with a selection of a first node from a plurality of nodes of the energy storage system. As another example, the user input may involve a user typing the name of a first node from a plurality of nodes of the energy storage system. In some exemplary embodiments, the user input may be received in the form of speech from the user and one or more speech-to-text algorithms may be used to convert the speech into text, which in turn may be converted to a selection of the one or more nodes by the processor.

Figure 2:
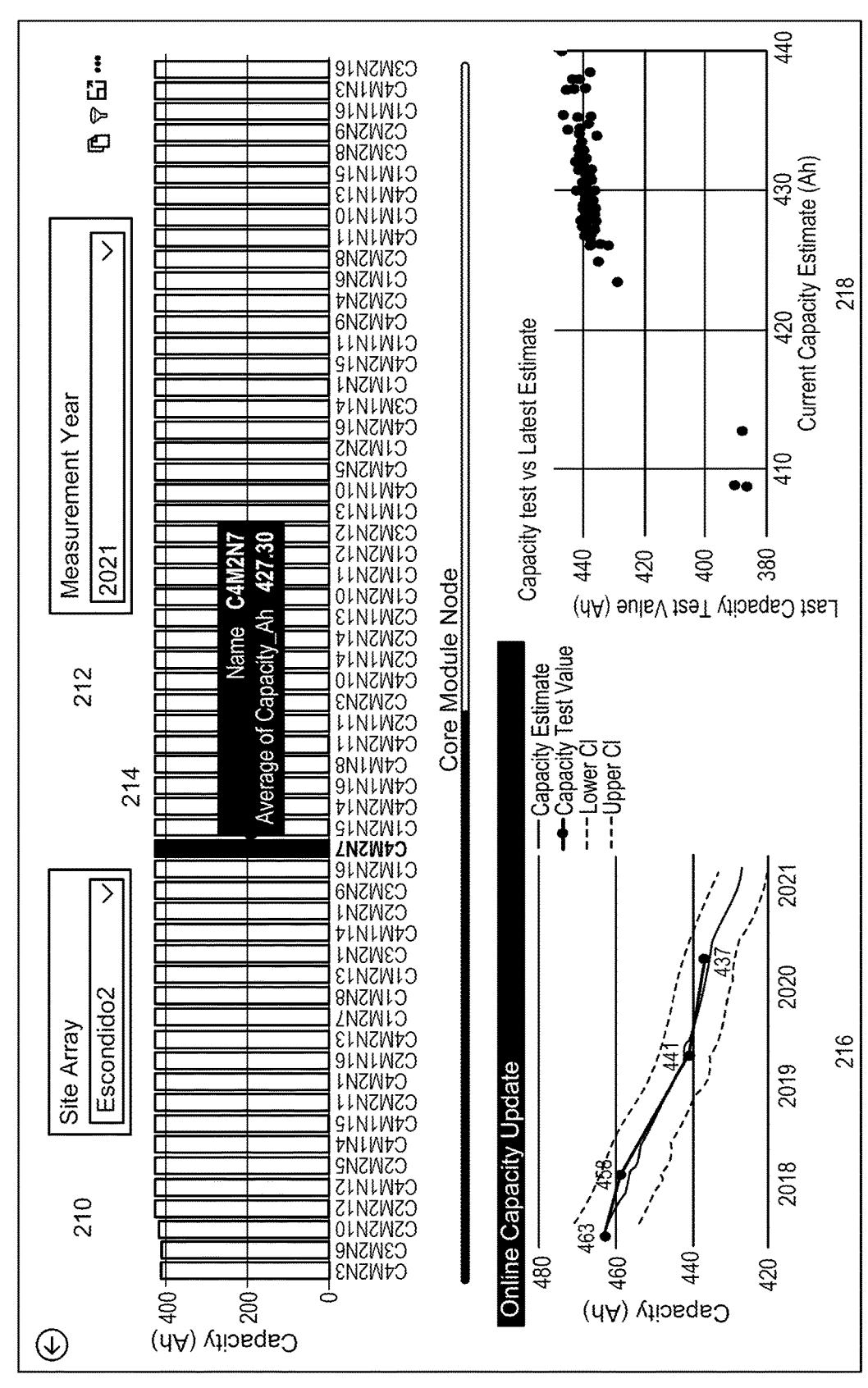
FIG. 2 illustrates an exemplary dashboard for managing capacity of an energy storage system, consistent with some embodiments of the present disclosure.

FIG. 2 illustrates an exemplary dashboard 200 for managing capacity of an energy storage system, consistent with some embodiments of the present disclosure. As shown in FIG. 2, dashboard 200 may include an interactive zone including a first zone 210 and second zone 212. First zone 210 may include an interactive element, such as a drop-down menu, to select one or more nodes for capacity estimation. Second zone 212 may include an interactive element, such as a drop-down menu, to select one or more measurement years associated with a capacity estimation. Dashboard 200 may also include a third zone 214, which a user may interact with to select a specific node for capacity estimation. Third zone 214 may include interactive elements such as a sliding menu of nodes with selectable nodes, such as by clicking on the node, for capacity estimation of a particular node. Dashboard 200 may also include display region 216 of a capacity estimate over time for a selected node. Dashboard 200 may further include a display region 218 of a current capacity mapped against a last capacity test value. It is contemplated that an exemplary dashboard may contain some or all of the above described elements.

In some embodiments, the system further comprises a troubleshooting module, wherein the at least one processor is configured to determine, using the troubleshooting module, at least one error parameter associated with the at least one node based on the estimated capacity of the at least one node. A troubleshooting module may include any hardware, software, or combination thereof configured to determine the at least one error parameter. An error parameter may include any value associated with a fault or malfunction of any component of the energy storage system, especially as it relates to capacity. For example, the troubleshooting module may determine that a given battery configuration is not optimal based on the determined capacity and the at least one error parameter may be a degree of optimization, which may refer to a measure, percentage, ratio, or value corresponding to how optimized a given battery configuration is based on a capacity determination. Thus, the degree of optimization may be used to reconfigure the battery architecture to optimize battery function. Other non-limiting examples of at least one error parameter associated with the at least one node include sensor error and an error in measurement technique.

Disclosed embodiments include a method of managing capacity of an energy storage system, comprising: generating, via at least one node, energy data; and executing, via at least one processor, instructions stored in a memory to cause the at least one processor to: extract, using a data storage module, the energy data from the at least one node; ingest, using a data aggregation module, first data from the data storage module; estimate, using a capacity estimation module, a capacity of the at least one node by: importing second data from the data aggregation module; determining at least one input configured to modulate a capacity determination and at least one output; and determining the capacity of the at least one node based on the calculated at least one input and at least one output; and implement a corrective action for the energy storage system based on the estimated capacity.

Figure 3A:
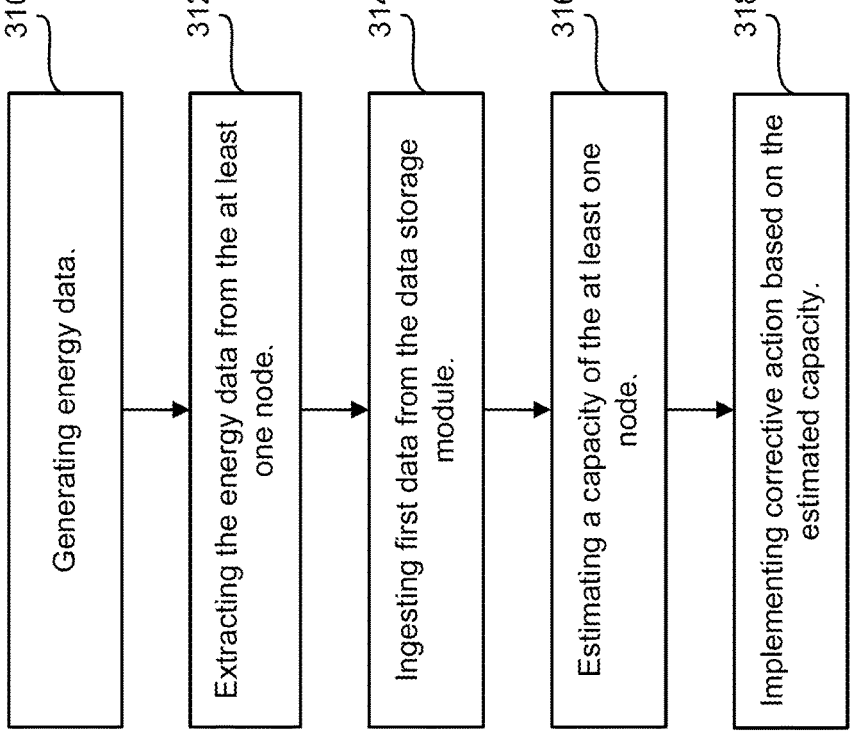
FIG. 3A illustrates a flowchart of an exemplary method for managing capacity of an energy storage system, consistent with some embodiments of the present disclosure.

FIG. 3A illustrates a flowchart 300 of a method for managing capacity of an energy storage system, consistent with some embodiments of the present disclosure. Method 300 may include a step 310 of generating, via at least one node, energy data. Method 300 may include a step 312 of extracting, using a data storage module, the energy data from the at least one node. Method 300 may include a step 314 of ingesting, using a data aggregation module, first data from the data storage module. Method 300 may include a step 316 of estimating, using a capacity estimation module, a capacity of the at least one node by: importing second data from the data aggregation module; determining at least one input configured to modulate a capacity determination and at least one output; and determining the capacity of the at least one node based on the calculated at least one input and at least one output. Method 300 may include a step 318 of implementing a corrective action for the energy storage system based on the estimated capacity.

Figure 3B:
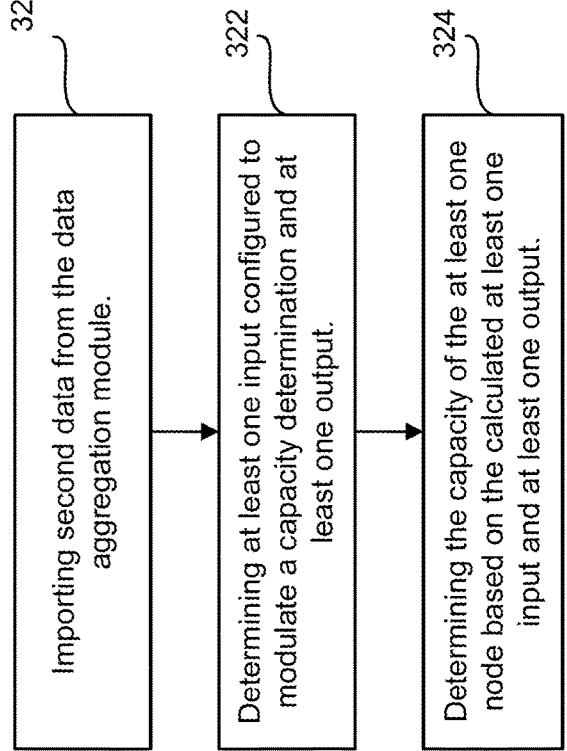
FIG. 3B illustrates a flowchart of an exemplary method for estimating capacity of at least one node of an energy storage system, consistent with some embodiments of the present disclosure.

FIG. 3B illustrates a flowchart of a method for estimating capacity 316 of at least one node of an energy storage system, consistent with some embodiments of the present disclosure. Estimating capacity 316 may include a step 320 of importing second data from the data aggregation module. Estimating capacity 316 may further include a step 322 of determining at least one input configured to modulate a capacity determination and at least one output. Estimating capacity 316 may also include a step 324 of determining the capacity of the at least one node based on the calculated at least one input and at least one output.

Disclosed embodiments include a non-transitory computer readable medium for managing capacity of an energy storage system, comprising instructions configured to cause at least one processor to: extract, using a data storage module, energy data from the at least one node; ingest, using a data aggregation module, first data from the data storage module; estimate, using a capacity estimation module, a capacity of the at least one node by: importing second data from the data aggregation module; determining at least one input configured to modulate a capacity determination and at least one output; and determining the capacity of the at least one node based on the calculated at least one input and at least one output; and implement a corrective action for the energy storage system based on the estimated capacity.

As used herein, a non-transitory computer-readable storage medium refers to any type of physical memory on which information or data readable by at least one processor can be stored. Examples include Random Access Memory (RAM), Read-Only Memory (ROM), volatile memory, nonvolatile memory, hard drives, CD ROMs, DVDs, flash drives, disks, any other optical data storage medium, any physical medium with patterns of holes, markers, or other readable elements, a PROM, an EPROM, a FLASH-EPROM or any other flash memory, NVRAM, a cache, a register, any other memory chip or cartridge, and networked versions of the same. The term "computer-readable storage medium" may refer to multiple structures, such as a plurality of memories or computer-readable storage media located within an input unit or at a remote location. Additionally, one or more computer-readable storage media can be utilized in implementing a computer-implemented method. Accordingly, the term computer-readable storage medium should be understood to include tangible items and exclude carrier waves and transient signals.

It will be apparent to those skilled in the art that various modifications and variations can be made to the disclosed systems and methods for managing capacity of an energy storage system without departing from the scope of the disclosure. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

The invention claimed is:

1. A system for managing capacity of an energy storage system, comprising:

at least one node configured to generate energy data;

at least one processor; and a memory storing instructions that, when executed by the at least one processor, cause the at least one processor to:

extract, using a data storage module, the energy data from the at least one node;

ingest, using a data aggregation module, first data from the data storage module;

estimate, using a capacity estimation module, a capacity of the at least one node by:

importing second data from the data aggregation module;

determining at least one input configured to modulate a capacity determination; and determining the capacity of the at least one node based on the calculated at least one input; and implement a corrective action for the energy storage system based on the estimated capacity, wherein implementing the corrective action includes adjusting one or more physical parameters associated with the at least one node, the one or more physical parameters including at least one of a temperature, a configuration, a number of components, or a material of a node.

2. The system of claim 1, further comprising a dashboard configured to continuously update at least one output parameter based on the estimated capacity of the at least one node.

3. The system of claim 2, wherein the dashboard is configured to present a corresponding capacity output for each of a plurality of nodes of the energy storage system.

4. The system of claim 2, wherein the dashboard includes an interactive zone configured to accept a user input, and the at least one processor is configured to:

receive the user input representative of a selection of a first node from a plurality of nodes of the energy storage system; and estimate, using the capacity estimation module, the capacity of only the selected first node.

5. The system of claim 1, wherein the at least one input includes one or more of an error parameter associated with a current sensor of the at least one node or a state of charge error parameter associated with the at least one node.

6. The system of claim 1, wherein the at least one input includes a starting capacity parameter associated with the at least one node.

7. The system of claim 6, wherein the at least one input includes a starting capacity variance parameter associated with the starting capacity parameter.

8. The system of claim 1, wherein the at least one input includes a forgetting factor parameter associated with the at least one node that determines a weight associated with a previous recursive value.

9. The system of claim 1, wherein the at least one input includes a scaling factor parameter associated with:

a state of charge error parameter associated with the at least one node; and an error parameter associated with a first current sensor of the at least one node.

10. The system of claim 1, wherein the capacity estimation includes a rainflow cycle calculation to determine at least one partial cycle for use in the capacity estimation, and wherein the at least one partial cycle includes a partial discharge and recharge of the at least one node.

11. The system of claim 1, wherein the capacity estimation module is configured to simultaneously estimate capacity values for a plurality of nodes in the energy storage system.

12. The system of claim 1, wherein the capacity estimation module is configured to simultaneously estimate capacity values for a plurality of nodes in a plurality of energy storage systems.

13. The system of claim 1, further comprising a troubleshooting module, wherein the at least one processor is configured to determine, using the troubleshooting module, at least one error parameter associated with the at least one node based on the estimated capacity of the at least one node.

14. The system of claim 1, wherein the one or more physical parameters associated with the at least one node are adjusted to correct a subsequent estimated capacity of the at least one node by increasing or decreasing the subsequent estimated capacity.

15. A method of managing capacity of an energy storage system, comprising:

generating, via at least one node, energy data; and executing, via at least one processor, instructions stored in a memory to cause the at least one processor to:

extract, using a data storage module, the energy data from the at least one node;

ingest, using a data aggregation module, first data from the data storage module;

estimate, using a capacity estimation module, a capacity of the at least one node by:

importing second data from the data aggregation module;

determining at least one input configured to modulate a capacity determination; and determining the capacity of the at least one node based on the calculated at least one input; and implement a corrective action for the energy storage system based on the estimated capacity, wherein implementing the corrective action includes adjusting one or more physical parameters associated with the at least one node, the one or more physical parameters including at least one of a temperature, a configuration, a number of components, or a material of a node.

16. A non-transitory computer readable medium for managing capacity of an energy storage system, comprising instructions configured to cause at least one processor to:

extract, using a data storage module, energy data from at least one node;

ingest, using a data aggregation module, first data from the data storage module;

estimate, using a capacity estimation module, a capacity of the at least one node by:

importing second data from the data aggregation module;

determining at least one input configured to modulate a capacity determination; and determining the capacity of the at least one node based on the calculated at least one input; and implement a corrective action for the energy storage system based on the estimated capacity, wherein implementing the corrective action includes adjusting one or more physical parameters associated with the at least one node, the one or more physical parameters including at least one of a temperature, a configuration, a number of components, or a material of a node.

17. The method of claim 15, further comprising:

presenting, via a dashboard, a continuously updated output parameter based on the estimated capacity of the at least one node.

18. The method of claim 17, further comprising:

receiving, via the dashboard, a user input selecting a first node from a plurality of nodes of the energy storage system, wherein the estimating includes estimating the capacity of only the selected first node.

19. The method of claim 15, wherein the at least one input includes one or more of: an error parameter associated with a current sensor of the at least one node, a state of charge error parameter, a starting capacity parameter, a starting capacity variance parameter, a forgetting factor parameter, or a scaling factor parameter.

20. The method of claim 15, wherein the estimating the capacity includes performing a rainflow cycle calculation to determine at least one partial cycle, the at least one partial cycle including a partial discharge and recharge of the at least one node.

21. The method of claim 15, further comprising:

determining, using a troubleshooting module, at least one error parameter associated with the at least one node based on the estimated capacity.

22. The system of claim 1, wherein adjusting the configuration associated with the at least one node includes changing a connection of the at least one node from a parallel configuration to a series configuration or from a series configuration to a parallel configuration.

* * * * *